Patented Feb. 26, 1924.

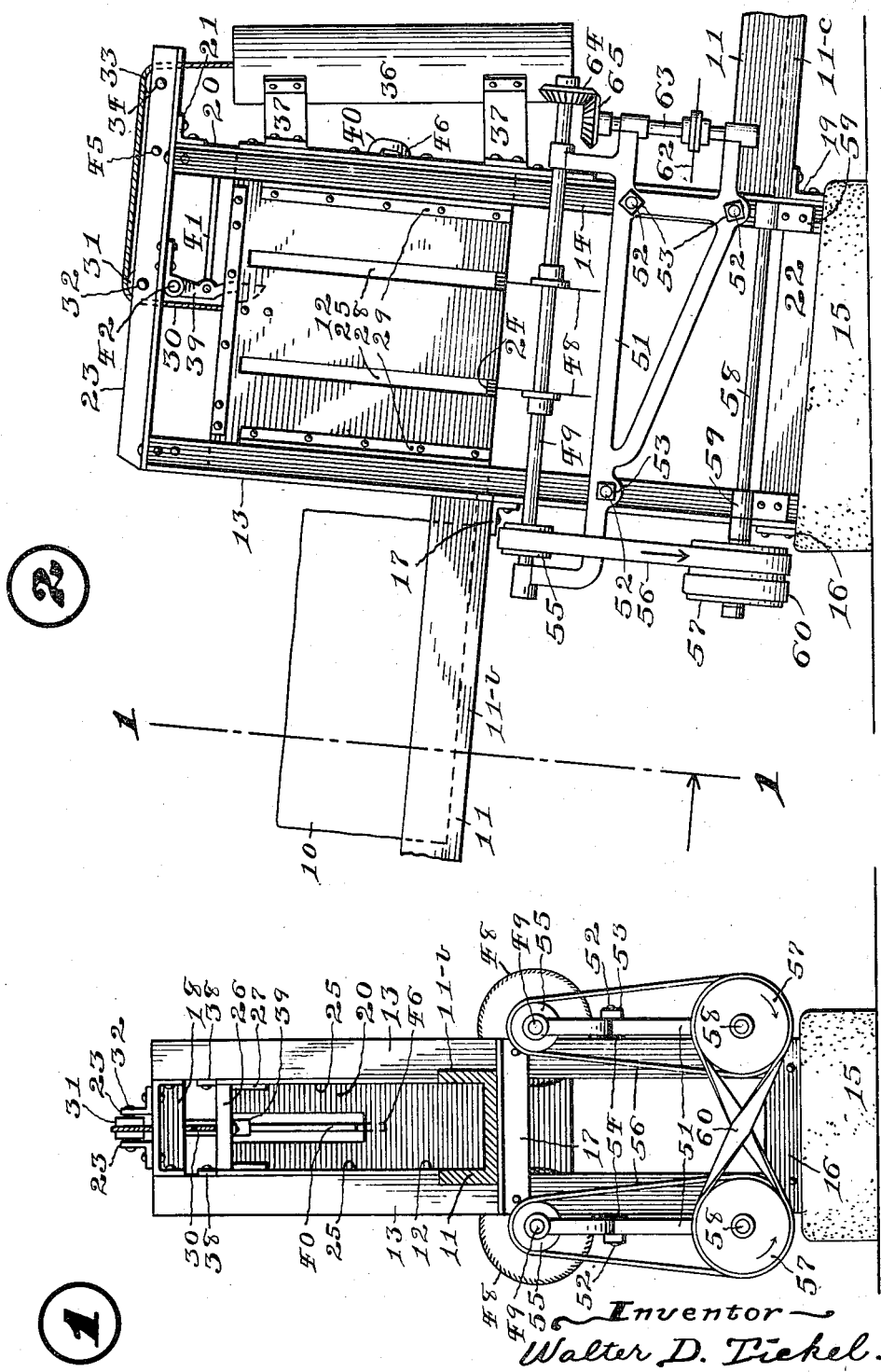

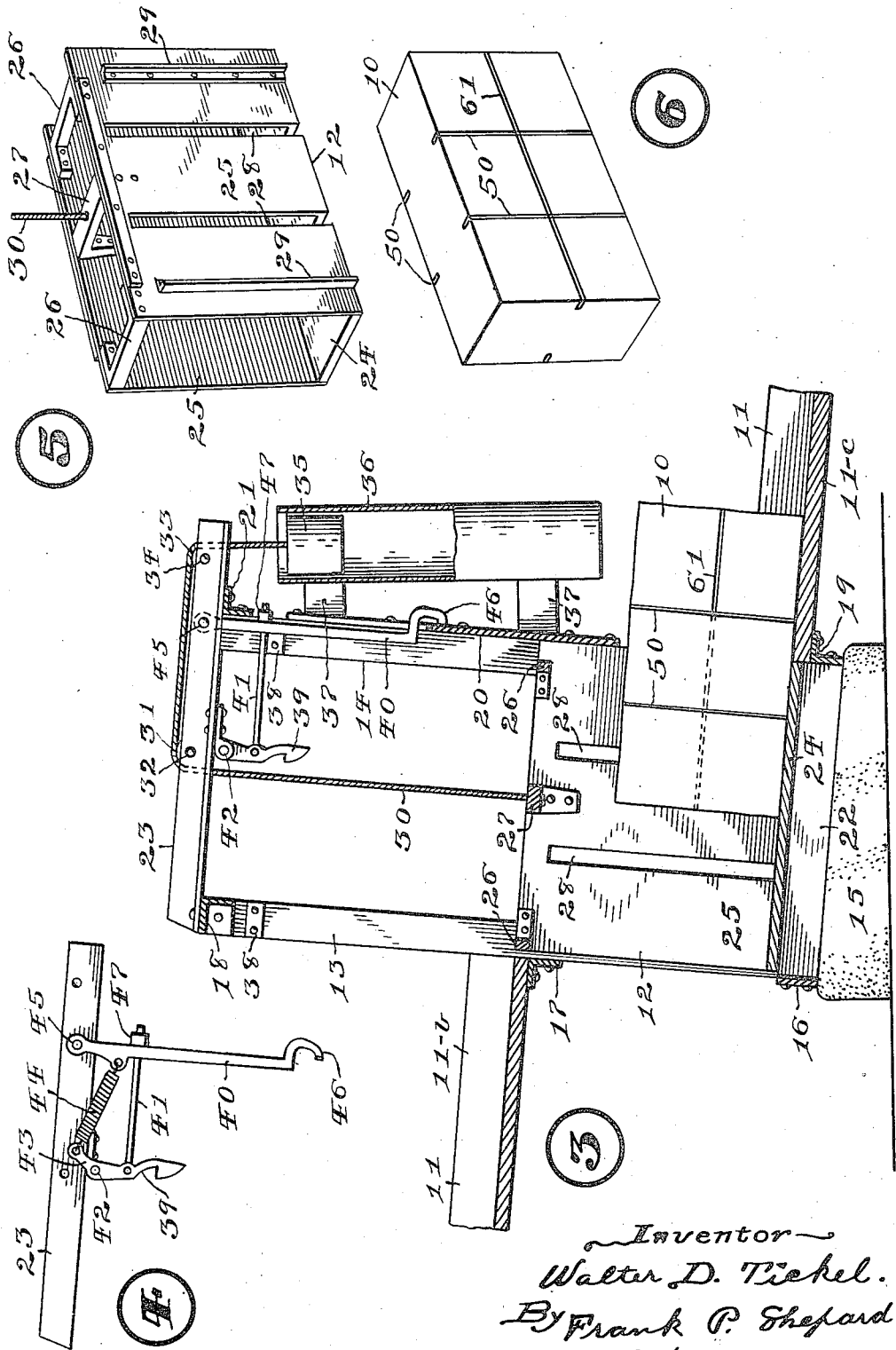

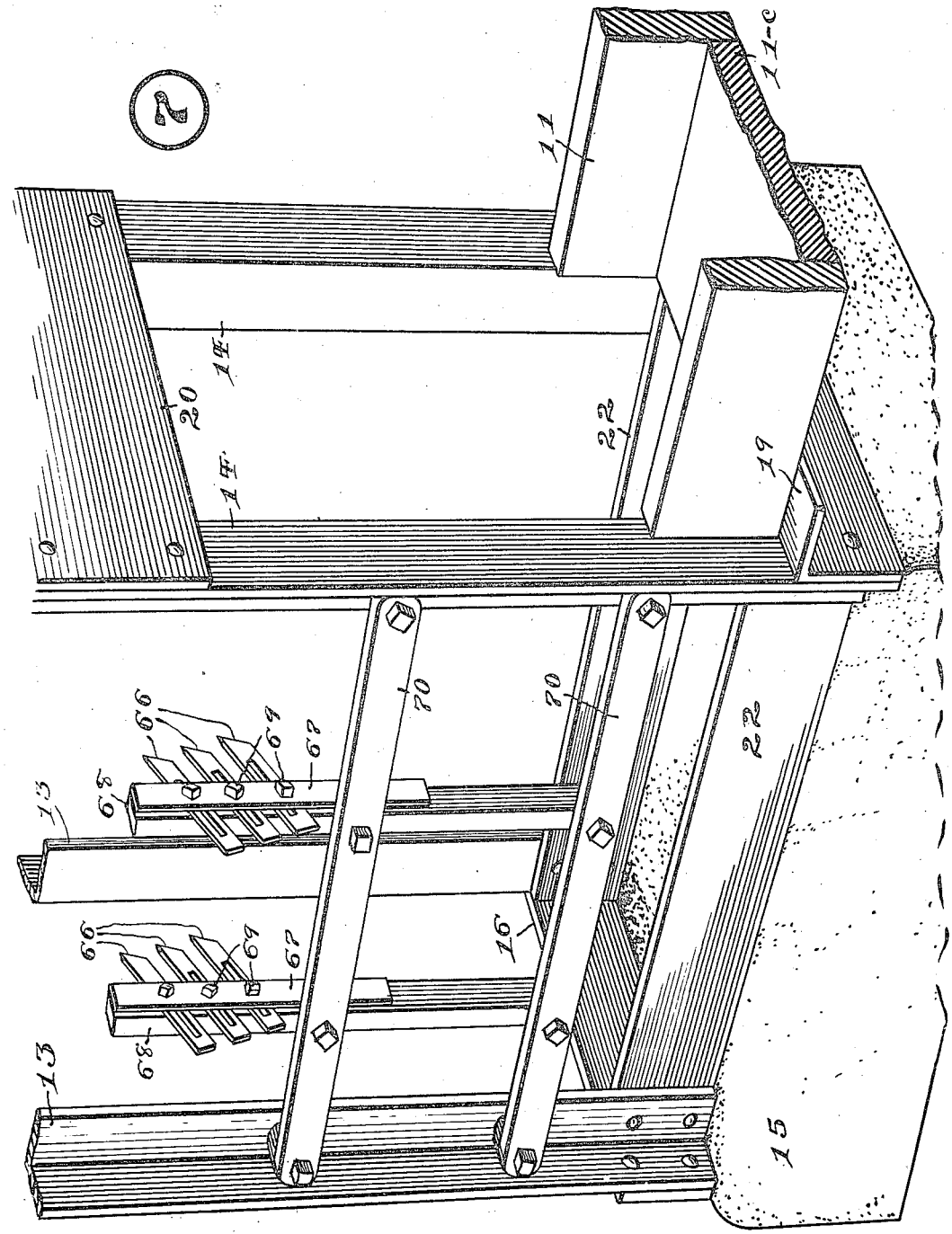

1,485,316

UNITED STATES PATENT OFFICE.

WALTER D. TICKEL, OF OKLAHOMA CITY, OKLAHOMA, ASSIGNOR TO PEERLESS ICE SCORING MACHINE CO., OF OKLAHOMA CITY, OKLAHOMA.

MACHINE FOR MARKING ICE.

Application filed May 12, 1920. Serial No. 380,843.

*To all whom it may concern:*

Be it known that I, WALTER D. TICKEL, a citizen of the United States, and a resident of Oklahoma City, in the county of Oklahoma and State of Oklahoma, have invented certain Improvements in Machines for Marking Ice, of which the following is a specification, reference being had to the accompanying drawings.

The object of the invention is to provide a suitable machine for kerfing or otherwise marking cakes of ice, so that when ice is being delivered to customers the cakes cannot be cut or broken except on planes which include the kerfs or marks.

Referring to the seven figures of the drawings:

Figure 1 is a sectional view of the machine, taken on the line 1—1 of Figure 2.

Figure 2 is a side elevation of the machine with a cake of ice descending a chute to it, the right-hand side of the figure being taken as the front or delivery end of the machine for purposes of this description.

Figure 3 is a sectional view of the machine in the same direction as Figure 2, but with a certain ice carrying cage at the lower end of its throw and with the cake of ice partially slid out of said cage into a delivery chute; certain kerfing or grooving tools being omitted.

Figure 4 is a view in the same direction, showing parts used in the upper part of the machine, with the addition of a tension spring.

Figure 5 is a perspective view of the ice-carrying cage.

Figure 6 is a similar view of a cake of ice which has been passed through the machine and kerfed.

Figure 7 is a perspective view at closer range and in different direction, showing fragments of the main frame and a different arrangement of kerfing tools.

Like characters of reference designate like parts in all the figures.

The chute along which the cakes of ice are handled in an ice plant usually slopes downward to the point of delivery so that the ice will slide therein by gravity; and since it is preferable that the path of movement of the ice-carrying cage referred to be at right angles to said chute the frame-work which guides said cage is shown leaning forward.

In carrying the invention into practice, the cake of ice 10 is moved past some suitable kerfing or marking tool, for example a fixed chisel-pointed grooving tool or a circular saw on a mandrel, with the result that kerfs or grooves are cut in one or more of the plane surfaces of the cake.

The apparatus shown in this instance includes a chute 11 which may lead from the ice-room or other source of caked ice in an ice-plant and should have just enough slope to insure movement of the ice by gravity.

All kerfs which are parallel with the line of movement of the cake of ice 10 along the chute 11 may be cut by one movement of said cake past suitable tools located along said chute; but in order to cut kerfs at right angles to the first ones there is provided a carriage, previously referred to, which has movement at right angles to the chute and is adapted to receive the cake after the first kerfs are cut and carry said cake past a second tool or set of tools; the invention including an improved construction and arrangement of parts whereby the movements of the carriage are controlled by the cake itself.

The carriage in this instance is in the form of a cage 12 which is movable vertically at right angles to the chute 11.

In arranging a suitable supporting and guiding frame-work for the cage 12, four corner-posts 13 and 14, which may be of angle iron, are erected on a suitable foundation 15.

The two corner-posts 13 of the rear pair are rigidly connected together at their lower ends by a riveted cross-plate 16; at mid-height by a riveted angle-iron cross-bar 17 which supports the adjacent end of the incoming portion 11$^b$ of the chute 11; and at their upper ends by a riveted cross-bar 18.

The two corner-posts 14 of the front pair are connected rigidly together at their lower ends by a riveted angle-iron cross-bar 19 which supports the adjacent end of the outgoing portion 11$^c$ of the chute 11; at mid-height by a sheet-metal front wall 20; and at their upper ends by an angle-iron cross-bar 21.

The lower end of each corner-post of each pair is rigidly connected to the corresponding corner-post of the other pair by a riveted side-plate 22; and at the upper ends of said corner-posts the cross-bar 18 of the rear pair is rigidly connected to the cross-bar 21 of the front pair by a pair of angle-iron bars 23 which forwardly overhang the frame-work for purposes later shown.

The cage 12 consists of a bottom 24 with side walls 25, the latter being connected together at their upper edges by riveted cross-bars 26 and 27 and being provided with vertical slots 28 to allow attack of the kerfing or grooving tools carried by the framework.

The corner-posts 13 and 14 guide the cage 12 against lateral swinging movement, and cleats 29 riveted to the side walls 25 of the cage are guided by the corner-posts to prevent endwise swinging movement of the cage.

The cage 12 is suspended by a flexible connection 30 which attaches to its center cross-bar 27 and passes up over a pulley 31 pivoted between the two upper bars 23 by a pin 32, said connection passing forward and down over a pulley 33 which is pivoted between the front overhanging ends of said bars by a pin 34.

This connection 30, after passing over the pulley 33, is attached to a weight 35 which is arranged to slide vertically in a guiding housing 36 supported from the front pair of corner-posts 14 by brackets 37.

With the cage 12 empty, the weight 35 is made heavy enough to hold it at the upper end of its throw and in contact with positive stops 38 riveted to the corner-posts 13 and 14.

The cage 12 in its uppermost position shown in Figures 1 and 2 is in position to receive a cake of ice 10 from the approaching portion 11$^b$ of the chute, and in order to hold the cage in receiving position until the full length of the cake has entered, a locking detent 39 is pivoted between the two bars 23 with its lower or hooked end in position to engage and hold the center cross-bar 27 at each upward throw of the cage.

A tripping lever 40 is pivoted between the bars 23 and hangs down in the path of movement of the entering cake of ice 10, this lever being operatively connected with the detent 39 by a rod 41; and when the cake of ice clears the approaching portion 11$^b$ of the chute and is wholly within the cage its front engages the lever 40 and disengages the detent 39, allowing the cage 12 to descend in opposition to the weight 35 and carry the cake past the tools designed to work on its surface.

As shown only in Figure 4, the detent 39 extends a little above its pivot pin 42, as at 43, and a tension spring 44 is attached to said extension to insure prompt locking engagement of the detent with the cross-arm 27 of the cage 11; and this spring is hitched to the tripping lever 40 at a point below its pivot pin 45 to yieldably hold said lever rearward to the limit of its throw, the rearward swinging movement of the lever under said spring being positively stopped by abutment of its lower hooked end 46 against the outside of the wall 20.

In order that the detent 39, in yielding for locking engagement with the cage 11, will not have to overcome the weight and inertia of the lever 40, the rod 41 passes slidably through said lever and is provided with a nut 47, the action of the spring 44 being to hold said nut against said lever.

During the downward movement of the cage 12, the cake of ice 10 slides in contact with the front wall 20 until completion of the full down throw of the cage, when it slides out of the cage under the lower edge of said wall and into the out-going portion 11$^c$ of the chute.

The weight 35 should be light enough not to start the cage 12 back upward before the entire length of the cake of ice 10 has been unloaded, and in order that the cage shall not move too quickly in either direction the housing 36 may be filled with water.

Circular saws 48, carried on suitable mandrels 49, may be employed to cut the vertical kerfs 50 in the cake 10, the mandrels being journaled in cast frames 51 which are arranged at the sides of the frame-work.

To support these frames 51, stud-bolts 52 may be set in the corner-posts 13 and 14 and provided with nuts 53, and to adjust the depth of cut of the saws 48 in the cake 10 compression springs 54, which are represented by solid black in Figure 1, are interposed between said frames and corner-posts at each stud-bolt and form yieldable bearings against which the frames are forcibly clamped by the nuts 53.

The mandrel 49 of each side frame 51 is provided with a belt pulley 55 which is driven, through a belt 56, from a belt pulley 57 running loosely on a shaft 58 anchored to bearings 59 on the lower ends of the corner-posts 13 and 14.

The loose pulley 57 at one side of the machine is operatively connected to that of the other shaft by a belt 60 as best shown in Figure 1; and power to drive the saws 48 may be applied to either one of said pulleys.

Longitudinal kerfs 61 in the cake 10 may be cut by saws 62 while the cake is sliding out of the cage and down the outgoing portion 11$^c$ of the chute, each of these saws being carried on a mandrel 63 journaled vertically in its respective frame 51; and each shaft 63 is driven by its respective mandrel 49 through gear-wheels 64 and 65.

As shown in Figure 7, one or more chisel-pointed grooving tools 66 may be employed in place of the saws 48 and 62, and each set of these tools may be held between two clamping bars 67 and 68 by bolts 69.

The main bar 68 of each clamping pair may be bolted to two side-bars 70 which are in turn bolted to the corner-posts 13 and 14.

Having thus described the invention, the following is claimed:—

1. A suitable support, a cage arranged to have reciprocating movement in the support, releasable means for holding the cage at one end of its throw, and means whereby movement of a cake of ice into the cage releases the holding means.

2. A suitable support, a cage arranged to have reciprocating vertical movement in the support, locking means to hold the cage at the upper end of its throw in the support, means to kerf the cake of ice during its movement and means whereby movement of the cake of ice into the cage releases the locking means.

3. A support, a cage mounted for vertical reciprocatory movement therein, releasable means for holding the cage at the upper end of its throw, means whereby full entering movement of a cake of ice into said cage releases said holding means, and means for kerfing the cake of ice during its transportation in the cage.

4. A suitable support, a cage arranged to have reciprocating vertical movement in the support, yieldable means acting to hold the cage at the upper end of its throw in the support, releasable means for locking the cage at the upper end of its throw, the cage being adapted to have a cake of ice slid into it at the upper end of its throw, means whereby completion of the entering movement of the cake of ice releases the locking means, and means whereby completion of the downward throw of the cage allows the cake of ice to slide from the cage.

5. A suitable support, a cage arranged to have reciprocating vertical movement in the support, yieldable means acting to hold the cage at the upper end of its throw in the support, releasable means for locking the cage at the upper end of its throw, the cage being arranged to have a cake of ice slid horizontally through it, means for preventing the cake of ice from sliding entirely through the cage while at the upper end of its throw, means whereby completion of the entering movement of the cake of ice into the cage releases the locking means, means for kerfing the cake of ice during its movement and means whereby completion of the downward throw of the cage allows the cake of ice to slide from the cage.

6. A suitable support, a cage arranged to have reciprocating vertical movement in the support, yieldable means acting to hold the cage at the upper end of its throw in the support, releasable means for locking the cage at the upper end of its throw, means whereby movement of a cake of ice into the cage releases the locking means, and a grooving tool projecting into position to act on the cake of ice as the cage moves to the lower end of its throw.

7. A suitable support, a cage arranged to have reciprocating vertical movement in the support, yieldable means acting to hold the cage at the upper end of its throw, releasable means for locking the cage at the upper end of its throw, the cage being adapted to have a cake of ice slid into it at the upper end of its throw, means whereby completion of the entering movement of the cake of ice into the cage releases the locking means, means whereby completion of the downward throw of the cage allows the cake of ice to slide from the cage, and a grooving tool projecting into position to act on the cake of ice as the cage moves to the lower end of its throw.

8. A support, a cage arranged to reciprocate in said support, releasable means for holding the cage at one end of its throw, means whereby movement of a cake of ice into the cage releases the holding means, and means for kerfing the ice during its transportation in the cage, and means for kerfing the cake of ice during its passage from the cage, said last-named means being operatively actuated from the first named kerfing means.

9. A support, a cage arranged to reciprocate in said support, releasable means for holding the cage at one end of its throw, means whereby movement of a cake of ice into the cage releases the holding means, and means for kerfing the ice during its transportation in the cage, and means for kerfing the cake of ice during its passage from the cage at an angle to the first-named kerfs, said last-named means being operatively actuated from the first-named kerfing means.

10. A suitable support, a cage arranged to have reciprocating movement in said support, releasable means for holding the cage at one end of its throw, means whereby movement of a cake of ice into the cage releases the holding means, and means for kerfing the cake of ice before it is discharged from the machine.

11. The herein described method which consists in moving a block of ice in the direction of its length and simultaneously scoring the sides thereof, and then moving said block of ice and simultaneously scoring the sides thereof in a direction transverse to the first score.

12. The herein described method which consists in moving a block of ice and simultaneously scoring the sides thereof and then moving said block in a direction at an angle to its first-named movement and simultaneously scoring the sides thereof in a direction transverse to the first score.

13. In a device of the kind described, the combination of a vertically-movable cage, a scoring device arranged adjacent said cage, means for directing a cake of ice to and from said cage, and means for returning the cage to its raised position.

14. In a device for the purpose described, the combination of a cage, and a scoring device arranged to score the ice in its passage out of said cage.

15. In a device for the purpose described, a cage and scoring means arranged in conjunction therewith to score the cake of ice before delivery from the machine.

16. In a device for the purpose described, a cage and a delivery chute, and scoring means arranged adjacent the same to score the cake of ice prior to its discharge from said chute.

17. In a device of the kind described, the combination of a chute having upper and lower openings, a shelf arranged adjacent the upper opening and a skid arranged adjacent the lower opening, a vertically movable cage adapted to receive a block of ice, scoring devices adapted to vertically score the opposite sides of said block of ice during the descent of the cage, and means for returning the same to its elevated position.

Witness my hand this 21st day of April, 1920.

WALTER D. TICKEL.